US008622590B2

(12) United States Patent
Cheng

(10) Patent No.: US 8,622,590 B2
(45) Date of Patent: Jan. 7, 2014

(54) ILLUMINANT ASSEMBLY STRUCTURE

(75) Inventor: Yu-Cheng Cheng, Taipei (TW)

(73) Assignee: Ya-Huei Chen, Taipei (TW)

( * ) Notice: Subject to any disclaimer, the term of this patent is extended or adjusted under 35 U.S.C. 154(b) by 128 days.

(21) Appl. No.: 13/419,207

(22) Filed: Mar. 13, 2012

(65) Prior Publication Data

US 2012/0236577 A1 Sep. 20, 2012

(30) Foreign Application Priority Data

Mar. 18, 2011 (TW) ............................ 100109417 A

(51) Int. Cl.
*B60Q 1/06* (2006.01)

(52) U.S. Cl.
USPC ........... 362/373; 362/294; 362/368; 362/646; 248/222.51

(58) Field of Classification Search
USPC ......... 362/373, 264, 368, 294, 370, 457, 458, 362/640, 646; 248/222.11, 222.51, 222.52
See application file for complete search history.

(56) References Cited

U.S. PATENT DOCUMENTS

| | | | | |
|---|---|---|---|---|
| 8,109,652 | B2 | 2/2012 | Chen | |
| 8,430,533 | B1 * | 4/2013 | Blalock et al. | 362/294 |
| 2009/0027900 | A1 * | 1/2009 | Janos et al. | 362/373 |
| 2011/0261572 | A1 * | 10/2011 | Watanabe et al. | 362/373 |

* cited by examiner

*Primary Examiner* — John A Ward
(74) *Attorney, Agent, or Firm* — Ming Chow; Sinorica, LLC

(57) ABSTRACT

An illuminant assembly structure comprises a hollow cover and an luminous device: the cover is concavely provided with an accommodating groove at the bottom for at least a conductive part accommodated inside and has several raised rims extending from the cover's inner edge; the luminous device comprises a circuit substrate and a shield and has at least a rotary vane extended from its outer surface wherein the circuit substrate is provided with a plurality of illuminants and rotary vanes including resilient electrodes and the shield allows a plurality of opening units to be opened on each rotary vane. The resilient electrodes are exposed via the shield's all opening units and are tightly coupled with the conductive parts for the illuminants growing with the luminous device installed on the cover's center and turned to a specific angle.

9 Claims, 9 Drawing Sheets

ILLUMINANT ASSEMBLY STRUCTURE

The current application claims a foreign priority to a patent application in Taiwan with a serial number 100109417 filed on Mar. 18, 2011.

BACKGROUND OF THE INVENTION

1) Field of the Invention

The present invention relates to an illuminant assembly structure, especially an illuminant assembly structure with an luminous device screwed in a cover's center.

2) Description of the Prior Art

Light Emitting Diode (LED) has been gradually applicable to lighting fixtures because of a variety of advantages such as long service life, power saving, durability, shock resistance, robustness, easy mass production, compactness, and fast response. As a practical product, LED, however, glows and causes high temperature which must be neutralized with the atmosphere via a thermal module to maintain normal status of LED. Therefore, a thermal module has close bond with LED.

LED and a thermal module based on the prior art still have drawbacks as follows:

1. LED is mounted on an aluminum plate which is securely locked on or attached to a thermal module for LED-induced thermal energy dissipated by the thermal module. However, it is economically ineffective to select this design which requires more time spent in machining and increases costs to complete an assembly.

2. LED based on the prior art must be connected to a power supply for introduction of electricity and LED growing. However, the complexity to connect all LEDs gradually is increased.

The applicant also made the U.S. patent application (application Ser. No. 12/400,923), "LED Assembly" (hereinafter referred to as cited reference) which is different from this disclosure in assembly and structure.

SUMMARY OF THE INVENTION

The object of the present invention is to provide an illuminant assembly structure with a luminous device which is screwed in a cover's center to realize resilient electrodes on the luminous device completely contacting conductive parts inside the cover and the illuminant assembly structure fast assembled (or disassembled).

The other object of the present invention is to provide an illuminant assembly structure comprising a cover and a luminous device, which are provided with a plurality of raised rims and rotary vanes, respectively, to make sure of surface-to-surface contact between conductive parts and resilient electrodes and hence between the luminous device and the cover perceived by one user. When the luminous device is screwed in the cover until a specific travel, the rotary vanes on the luminous device are limited and held by baffles of raised rims on the cover, i.e., the conductive parts touch the resilient electrodes to facilitate the present invention easily assembled by one user.

The further object of the present invention is to provide an illuminant assembly structure with a circuit substrate on which there are resilient electrodes tightly contacting conductive parts to complete electric conduction and transfer illuminant-induced heat to conductive parts for fast cooling.

To this end, the illuminant assembly structure comprises: a cover with a hollow portion, an accommodating groove concavely installed on the bottom, at least a raised rim on the cover's inner edge, and at least a concave comparatively developed on the cover's inner edge; at least a conductive part embedded in the cover's accommodating groove; an luminous device composed of a circuit substrate and a shield wherein at least a rotary vane extends from the luminous device's outer edge, the circuit substrate is provided with at least an illuminant and a resilient electrode linking the illuminant's positive and negative terminals, and the shield is designed to have at least an opening unit which corresponds to the resilient electrode and make the resilient electrodes exposed via the opening units. The luminous device which is coupled with the cover allows the luminous device's rotary vanes to be accommodated in the cover's concaves and the resilient electrodes to be held in the cover's raised rims and to tightly join the conductive parts inside the cover with the luminous device turned to a specific travel.

In a preferred embodiment, the conductive parts are two pieces, each of which is connected to a power's positive terminal (or negative terminal), for positive and negative electricity directed to the conductive parts.

In a preferred embodiment, the conductive part comprises a conductive portion which is accommodated in the cover's raised rims.

In a preferred embodiment, the resilient electrodes are mounted on a circuit substrate's rotary vanes.

In a preferred embodiment, the cover's raised rim has an open end and a baffle extending at the other end for the luminous device's one rotary vane embedded into a raised rim and held and fixed by the baffle.

In a preferred embodiment, the illuminant can be an LED or an Organic Light-Emitting Diode (OLED)

In a preferred embodiment, a guiding portion is convexly installed between the cover's two raised rims, and two limit portions are concavely installed on a circuit substrate's and a shield's rotary vanes and correspond to the guiding portion for the cover and the luminous device precisely assembled.

In a preferred embodiment, two opposite recesses are developed at the shield's front center for two recesses held by fingers and turning of the luminous device.

DETAILED DESCRIPTIONS OF THE PREFERRED EMBODIMENTS

Referring to FIG. 1 and FIG. 2 which are the exploded perspective view of the present invention of an illuminant assembly structure and the perspective view of an assembled illuminant assembly structure comprising:

A cover 1 with a hollow portion 14, an accommodating groove 11 concavely installed at the bottom, at least a raised rim 12 locating at the inner edge and extending inward, a baffle 121 extending from one end of the raised rim 12, an open end 122 at the other end of the raised rim 12, and a concave 13 comparatively developed on the cover's inner edge due to effect of the raised rim 12;

At least a conductive part 2 on which there are a conductive portion 21 and a wire connector 22 at the top of the conductive part 2 to link a wire; the conductive part 2 embedded and positioned in the accommodating groove 11 of the cover 1 and allowing the conductive portion 21 to be placed in a raised rim 12 of the cover 1; the conductive parts 2, preferably two conductive parts 2, each of which is connected to a power supply's positive terminal (or negative terminal), for electricity directed to the conductive parts 2;

A luminous device 3 composed of a circuit substrate 31 and a shield 32, each of which has at least an inward dent at its outer edge to develop at least a rotary vane 311 (or 321): (a) the circuit substrate 31 is provided with at least an illuminant 312 and resilient electrodes 313 on all rotary vanes 311 and the shield 32 is provided with at least an opening unit 322 on a rotary vane 321; (b) the resilient electrodes 313 correspond to and are exposed via the opening units 322 wherein each resilient electrode 313 is electrically connected to and in behalf of positive and negative terminals of the illuminant 312.

Furthermore, the luminous device 3 with an appearance similar to the shape of an inner edge of the cover 1 can fit the shape of the inner edge of the cover 1.

Also, the resilient electrodes 313 placed on the circuit substrate 31 extend from the circuit substrate 31 to the rotary vanes 311 and are exposed from the opening units 322.

Referring to FIGS. 3A and 3B which illustrate the luminous device 3 with the cover 1 integrated allows the luminous device 3 and the rotary vanes 311 (321) to align the cover 1 and the concaves 13 of the cover 1, respectively, wherein the luminous device 3 completely embedded in the hollow portion 14 of the cover 1 is turned to a specific travel only in the direction of open ends 122 of the raised rims 12 due to effects of each baffle 121 as well as each open end 122 at both ends of a raised rim 12 of the cover 1 but is limited and held by each baffle 121 at the other end of a raised rim 12. With the rotary vanes 311 and the rotary vanes 321 screwed in the raised rims 12 of the cover 1, the resilient electrodes 313 with which the conductive portions 21 of the conductive parts 2 are completely coupled make positive and negative electricity delivered to the resilient electrodes 313 and the illuminant bodies 312 via the conductive parts 2 for lighting.

Referring to FIG. 4 which is the schematic illustration of a heat sink externally connected to the illuminant assembly structure. For the circuit substrate 31 quickly cooled down, a heat sink 4 can attach to the bottom of the circuit substrate 31 and make the luminous device 3 configured between the cover 1 and the heat sink 4. With the resilient electrodes 313 contacting the conductive parts 2, the circuit substrate 31 which is lifted backward will be coupled with the heat sink 4 for fast cooling.

Referring to FIG. 5 which is the schematic illustration of the illuminant assembly structure with an alternative cover and an alternative luminous device wherein (a) a guiding portion 15 is convexly installed between two raised rims 12 of a cover 1 and (b) a limit portion 3211 is concavely installed in a rotary vane 311 (a rotary vane 321) of a circuit substrate 31 (a shield 32) in a luminous device 3 and is opposite to the guiding portion 15 of the cover 1. In virtue of this type of structure, the luminous device 3 with the cover 1 assembled allows the limit portion 3211 of the luminous device 2 to be within the guiding portion 15 of the cover 1 and both the cover 1 and the luminous device 3 to be precisely joined. Furthermore, the positive (negative) terminal of the conductive part 2 should link the positive (negative) terminal of the luminous device 3 for properly connected power circuit due to each of the conductive part 2 and the luminous device 3 with separate positive and negative supply voltages.

Referring to FIG. 6 which is the schematic illustration of the illuminant assembly structure with an alternative luminous device wherein two oppositely arranged recesses 33 are arranged at the front center of the shield 32 of a luminous device 3. Due to this configuration, the luminous device 3 with the cover 1 assembled facilitate a user to catch two recesses 33 by fingers and turn the luminous device 3, making the resilient electrodes 313 of the luminous device 3 successfully contact the conductive portions 21 of the conductive parts 2 and be easily screwed out of the cover 1.

Referring to FIG. 7 and FIG. 8 which are the exploded perspective view of a downlight and the schematic illustration of an assembled downlight based on the illuminant assembly structure. For integrity of one product, the present invention can be manufactured to be a downlight which is provided with some additional components different from the structure in FIG. 1 and FIG. 4: (a) A power supply 5 added behind a heat sink 4 and having positive and negative terminals connected to two conductive parts 2, both of which become a positive power supply and a negative power supply, respectively: The power supply 5 as one source of electricity of the luminous device 3 provides positive and negative electricity to the illuminant bodies 312 when the resilient electrodes 313 of the luminous device 3 contact the conductive parts 2; (b) A locating portion 16 which is installed on the cover 1 and joins a resilient locating element 161: The resilient locating element 161 on the locating portion 16 is coupled with the luminous device 3 and the cover 1 for these components securely embedded in a ceiling or a wall.

Additionally, electrical insulation is necessary between the metal-based cover 1 and the conductive parts 2. The cover 1 is also made with plastic material.

The illuminant assembly structure in the present disclosure has advantages superior to other devices based on prior arts as follows:

1. The present disclosure provides a luminous device screwed in a cover's center and conductive parts which flexibly contact resilient electrodes in order to realize an illuminant assembly structure featuring fast assembly and disassembly.

2. The present disclosure provides a luminous device and a cover in which conductive parts and resilient electrodes feature surface-to-surface contact and uses raised rims on the cover as well as rotary vanes on the luminous device to make sure of conductive parts contacting resilient electrodes perceived by one user. When the luminous device is screwed in the cover until a specific travel, the rotary vanes on the luminous device are limited and held by baffles of raised rims on the cover, i.e., the conductive parts contact the resilient electrodes, to facilitate the present invention easily assembled by one user.

3. The present disclosure provides a circuit substrate with resilient electrodes installed and a heat sink attached behind the circuit substrate. With the resilient electrodes tightly connecting conductive parts of the cover, the circuit substrate which is lifted backward by the resilient electrodes makes the circuit substrate and the heat sink closely contact to realize quick cooling.

BRIEF DESCRIPTIONS OF THE DRAWINGS

Figure 1:
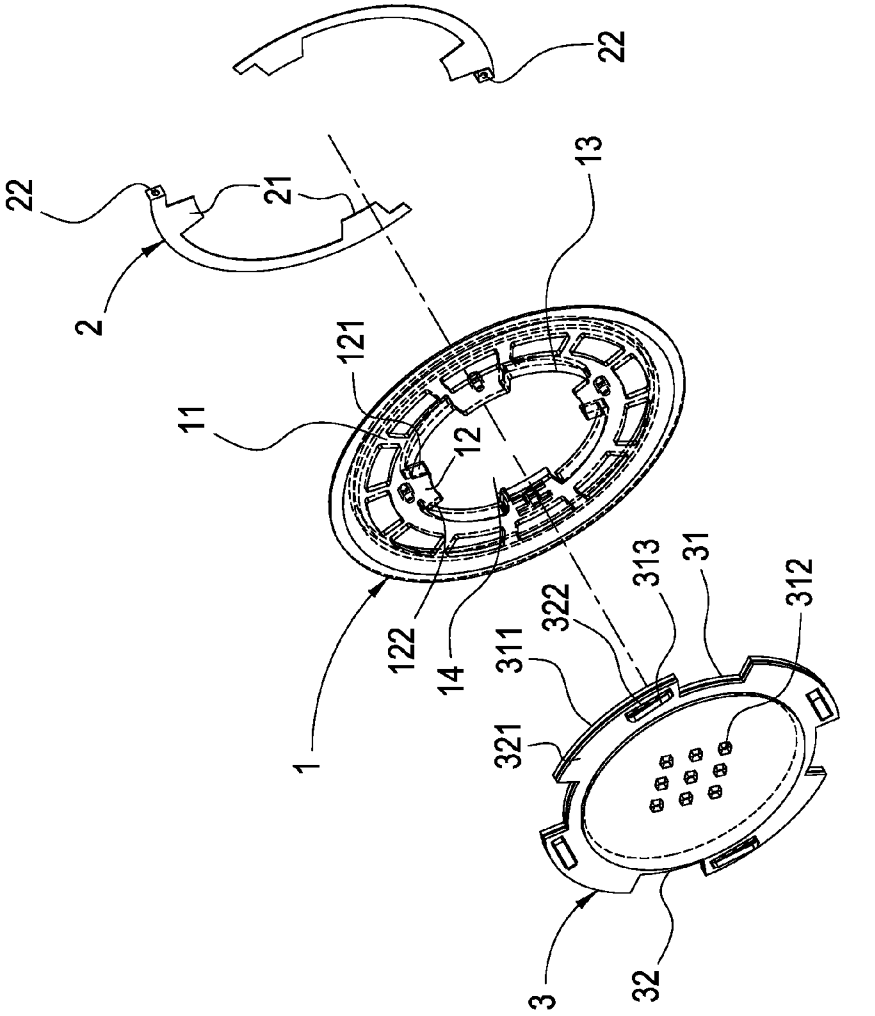
FIG. 1 is the exploded perspective view of the present invention of an illuminant assembly structure.
Figure 2:
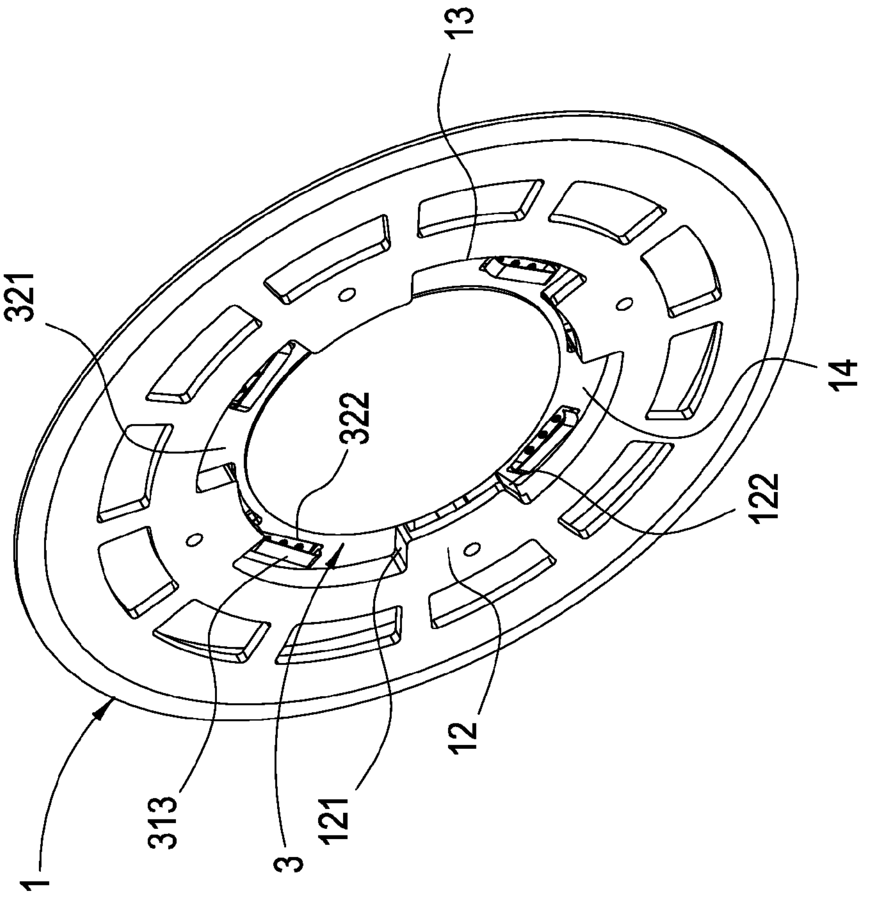
FIG. 2 illustrates the perspective view of an assembled illuminant assembly structure.
Figure 3A:
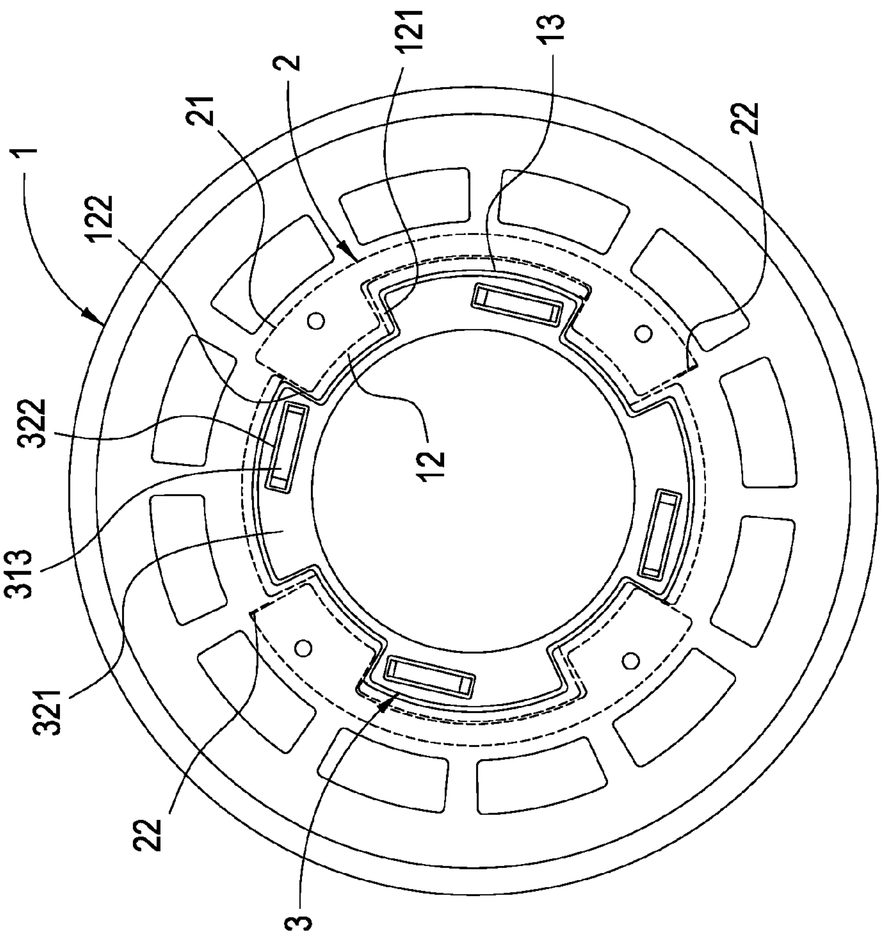
FIGS. 3A and 3B are schematic illustrations of an assembled illuminant assembly structure.
Figure 3B:
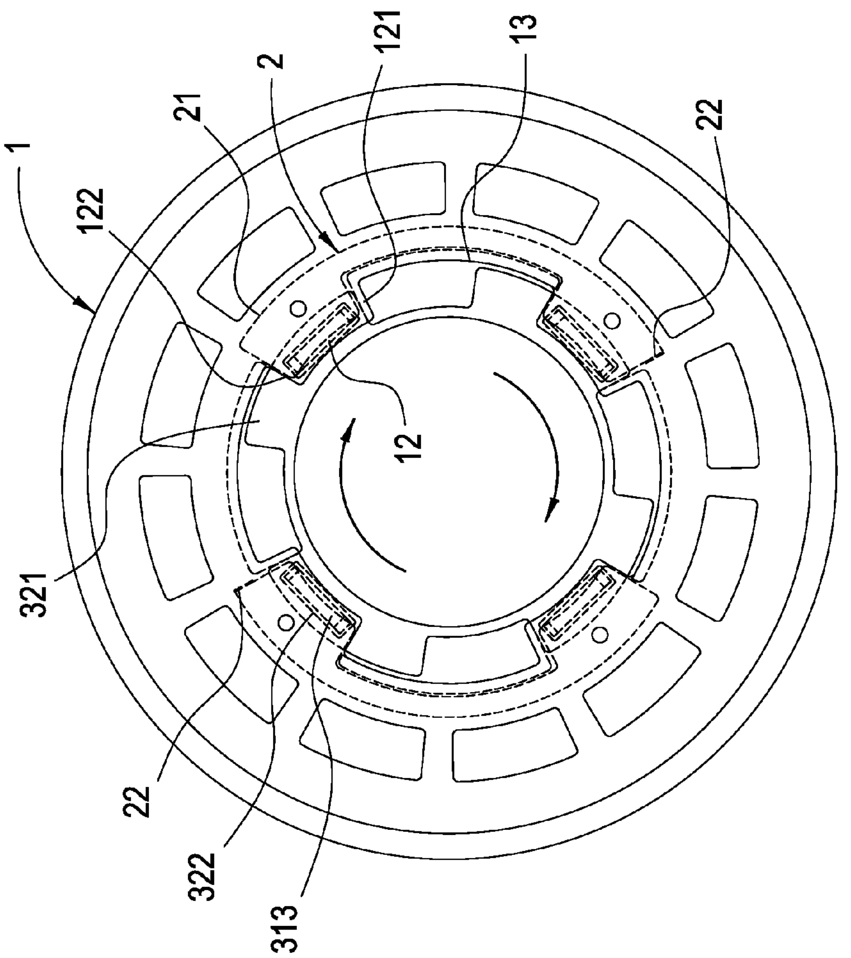
Figure 4:
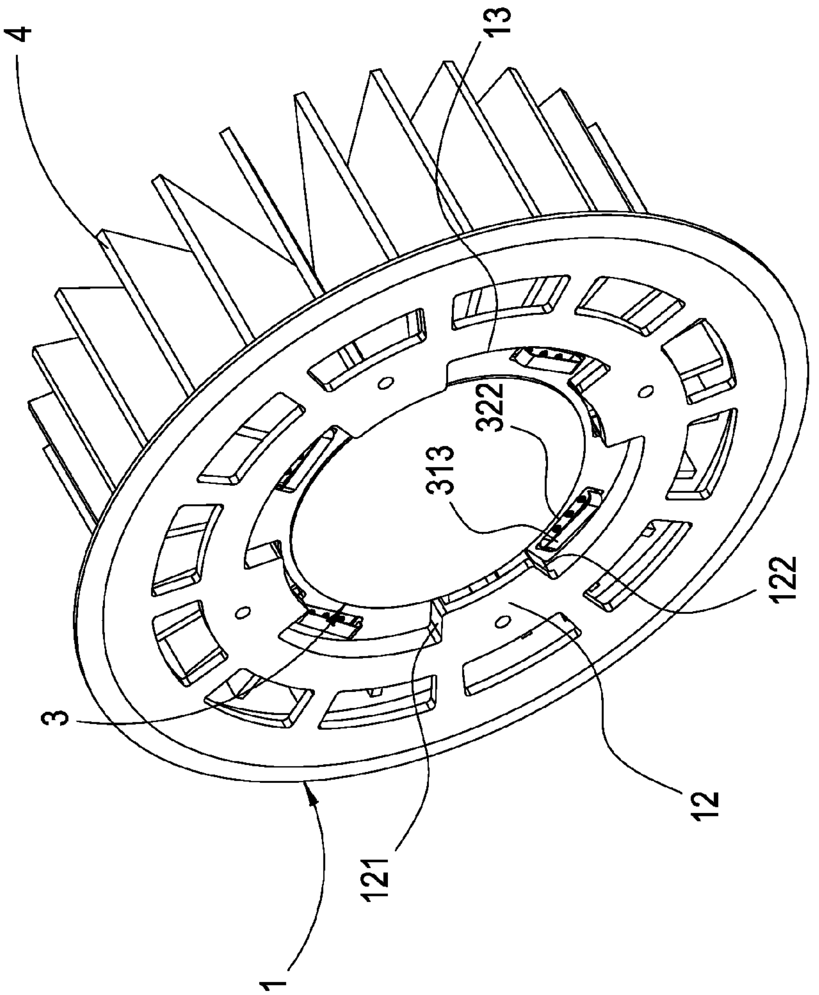
FIG. 4 is the schematic illustration of an external heat sink in an illuminant assembly structure.
Figure 5:
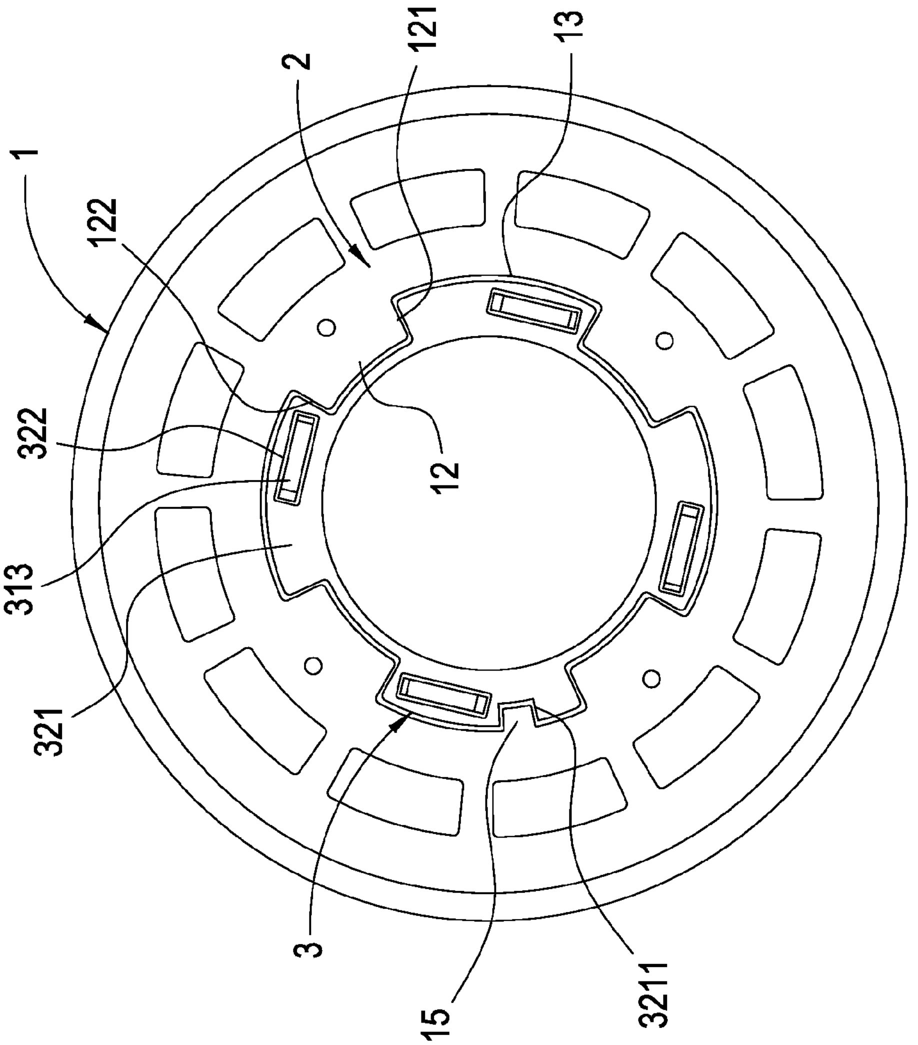
FIG. 5 is the schematic illustration of an illuminant assembly structure with an alternative cover and an alternative luminous device.
Figure 6:
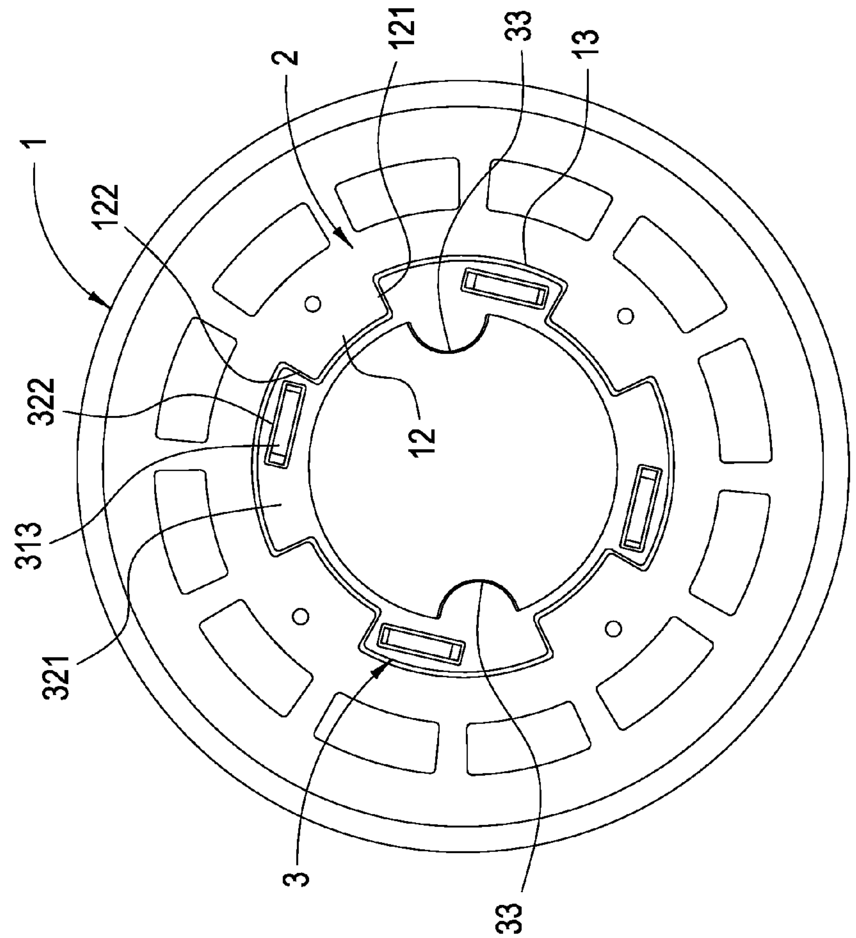
FIG. 6 is the schematic illustration of an illuminant assembly structure with an alternative luminous device.
Figure 7:
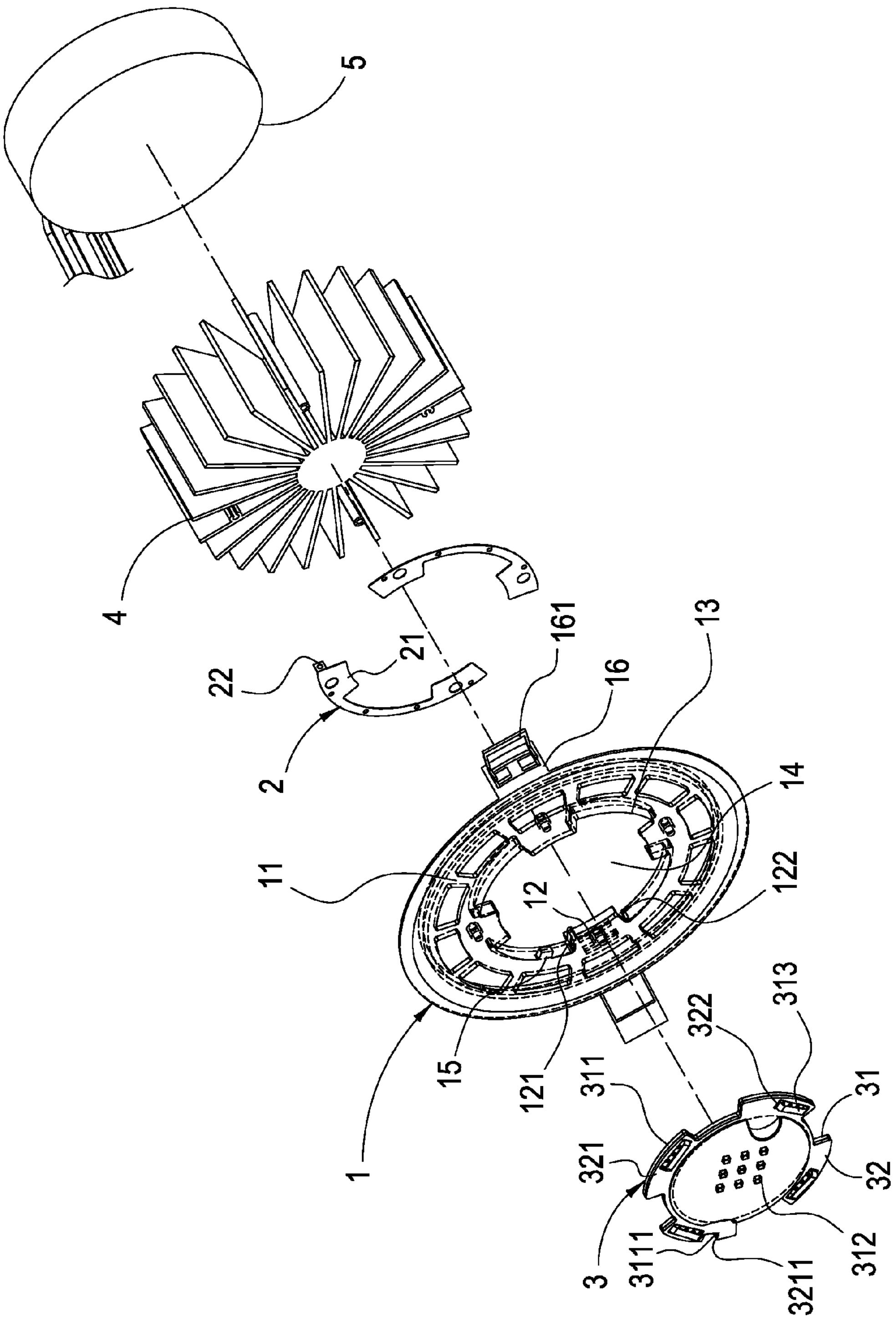
FIG. 7 is the exploded perspective view of a downlight based on the illuminant assembly structure.
Figure 8:
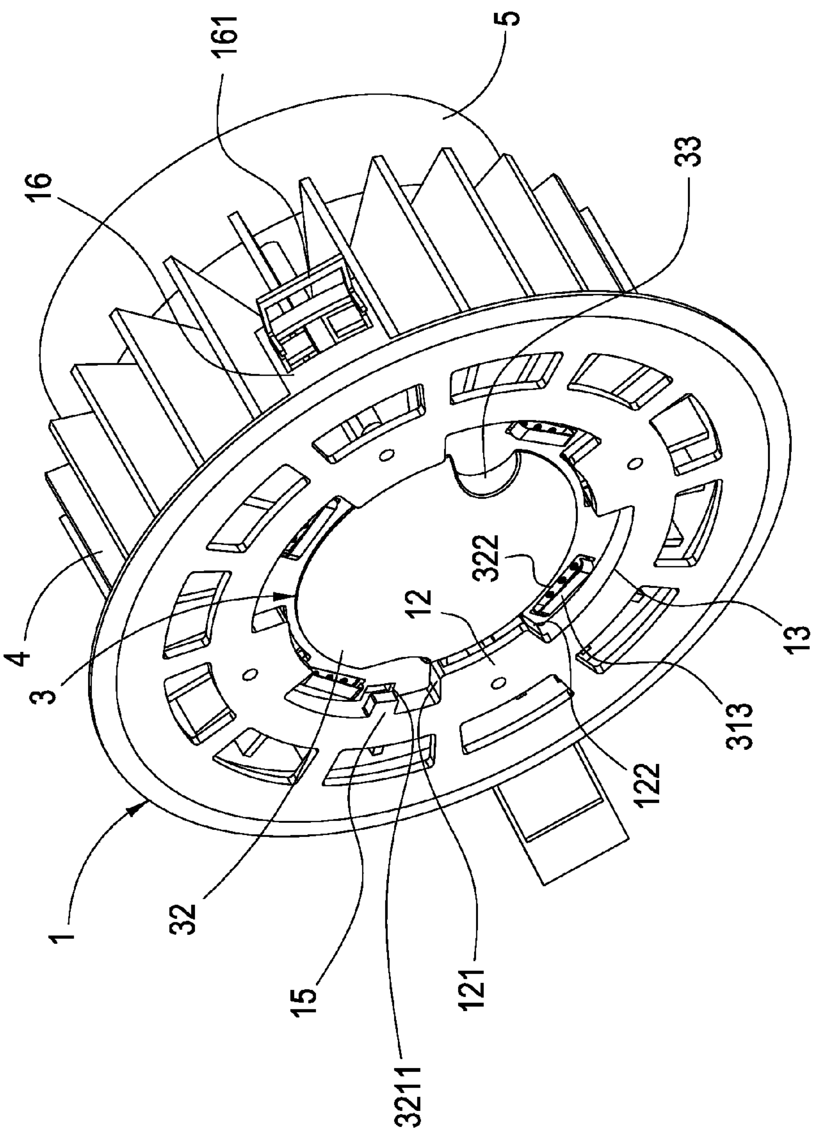
FIG. 8 is the schematic illustration of an assembled downlight based on the illuminant assembly structure.

What is claimed is:

1. An illuminant assembly structure, comprising:

a cover with a hollow portion, an accommodating groove concavely installed at its bottom, at least a raised rim locating at its inner edge and opposite to at least a concave;

at least a conductive part embedded in the cover's accommodating groove;

a luminous device composed of a circuit substrate and a shield and having at least a rotary vane extending from its outer edge: the circuit substrate is provided with at least an illuminant and at least a resilient electrode which is electrically connected to positive and negative terminals;

the shield has at least an opening unit which is opposite to a resilient electrode and allows the resilient electrode to be exposed from the opening unit;

the luminous device with the cover integrated for the rotary vanes of the luminous device accommodated in concaves of the cover as well as resilient electrodes held in the cover's raised rims and closely coupled with the conductive parts in the cover after the luminous device turned to a specific travel.

2. The illuminant assembly structure according to claim 1 wherein the conductive parts are divided to two parts, one connected to a power supply's positive terminal and the other a power supply's negative one, and allow positive and negative electricity to be directed to the conductive parts, respectively.

3. The illuminant assembly structure according to claim 1 wherein the conductive part comprises a conductive portion which is accommodated in a raised rim of the cover.

4. The illuminant assembly structure according to claim 1 wherein the resilient electrode is installed on a rotary vane of the luminous device.

5. The illuminant assembly structure according to claim 1 wherein the raised rim on the cover has an open end and a baffle extending from the other end to make a rotary vane of the luminous device held in the raised rim and limited by the baffle.

6. The illuminant assembly structure according to claim 1 wherein a guiding portion is convexly installed between the cover's two raised rims and a limit portion is concavely installed in a rotary vane of the luminous device and opposite to the guiding portion to realize the cover and the luminous device precisely coupling.

7. The illuminant assembly structure according to claim 1 wherein the shield has two recesses which are opposite to each other at the front center for the recesses caught by fingers and the luminous device turned.

8. The illuminant assembly structure according to claim 1 wherein the illuminant can be an LED.

9. The illuminant assembly structure according to claim 1 wherein the illuminant can be an OLED.

* * * * *